United States Patent
Kim

(10) Patent No.: US 7,493,018 B2
(45) Date of Patent: Feb. 17, 2009

(54) METHOD FOR CREATING CAPTION-BASED SEARCH INFORMATION OF MOVING PICTURE DATA, SEARCHING AND REPEATING PLAYBACK OF MOVING PICTURE DATA BASED ON SAID SEARCH INFORMATION, AND REPRODUCTION APPARATUS USING SAID METHOD

(76) Inventor: Kwang Su Kim, 1001, Hyundal Billet, 1495-1, Seocho-dong, Seocho-gu (KR) 137-070

( * ) Notice: Subject to any disclaimer, the term of this patent is extended or adjusted under 35 U.S.C. 154(b) by 1249 days.

(21) Appl. No.: 10/444,085

(22) Filed: May 23, 2003

(65) Prior Publication Data

US 2004/0047589 A1    Mar. 11, 2004

Related U.S. Application Data

(63) Continuation-in-part of application No. 09/401,799, filed on Sep. 22, 1999, now Pat. No. 6,754,435.

(30) Foreign Application Priority Data

| May 19, 1999 | (KR) | ............................ 1999-18124 |
| Nov. 1, 2002 | (KR) | ............................ 2002-67480 |
| Apr. 16, 2003 | (KR) | ............................ 2003-24137 |

(51) Int. Cl.
*H04N 5/91* (2006.01)
(52) U.S. Cl. .................... 386/69; 386/125; 386/126; 386/95; 386/52; 386/46
(58) Field of Classification Search .................. 386/69, 386/95, 125–126
See application file for complete search history.

(56) References Cited

U.S. PATENT DOCUMENTS

| 5,703,655 | A | * | 12/1997 | Corey et al. | .................. 348/468 |
| 5,784,528 | A | * | 7/1998 | Yamane et al. | .............. 386/112 |
| 5,982,979 | A | * | 11/1999 | Omata et al. | .................. 386/69 |
| 6,297,797 | B1 | * | 10/2001 | Takeuchi et al. | ............ 345/467 |
| 6,754,435 | B2 | * | 6/2004 | Kim | ............................ 386/69 |
| 2003/0190147 | A1 | * | 10/2003 | Lee | .............................. 386/70 |
| 2003/0190148 | A1 | * | 10/2003 | Lee | .............................. 386/70 |

* cited by examiner

*Primary Examiner*—Thai Q. Tran
*Assistant Examiner*—Helen Shibru
(74) *Attorney, Agent, or Firm*—Rothwell, Figg, Ernst & Manbeck, P.C.

(57) ABSTRACT

This invention relates to a method of conducting search of moving picture data stream and repeating playback of a data stream section based on the caption information, which is displayed with moving pictures, and a reproduction apparatus using such method. The present method creates and stores link information between caption data and position of moving picture stream which is reproduced concurrently with the caption data; displays a part of the caption data during playback; searches for a moving picture data section, which is concurrently presented with a particular caption chosen from the displayed caption data by a viewer, based on the created link information; and repeats playback of the found moving picture data section. This method is very useful to language practice because it can repeat to play a video section containing captions that a viewer wants to listen repeatedly.

8 Claims, 11 Drawing Sheets

FIG. 1

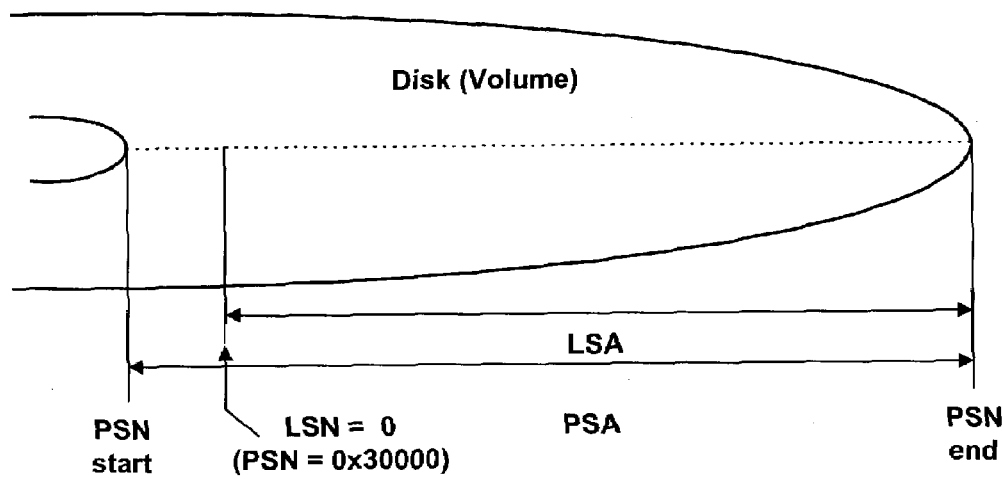

Disk (Volume)

LSA

PSN start   LSN = 0 (PSN = 0x30000)   PSA   PSN end

PSA : Physical Sector Area
LSA : Logical Sector Area
PSN : Physical Sector Number
LSN : Logical Sector Number

*Conventional Art*

FIG. 2

| LSN | LBN | Name | Components | Information |
|---|---|---|---|---|
| 0 ~ 256 | | UDF Bridge Volume Structure | Volume Recognition Seq. | |
| | | | Main Volume Descriptor Seq. | Volume ID, Date & Time |
| | | | Reserve Volume Descriptor Seq. | Logical Vol. Integrity Address |
| | | | Logical Volume Integrity Seq. | |
| | | | 1st Anchor Point | Volume Descriptor Seq. Address |
| 257 ~ (p-1) | | ISO 9660 File Structure | Path Table / Directory Record | |
| p ~ (p+q-1) | 0 ~ (q-1) | UDF File Structure | File Set Descriptor | LBN 0 |
| | | | File Identifier Descriptor | |
| | | | File Entry | |
| (p+q) ~ last-1 | q ~ last 1 | File Data Structure | | |
| Last LSN | | Anchor Volume Descriptor Ptr. | 2nd Anchor Point | Volume Descriptor Seq. Address |

*Conventional Art*

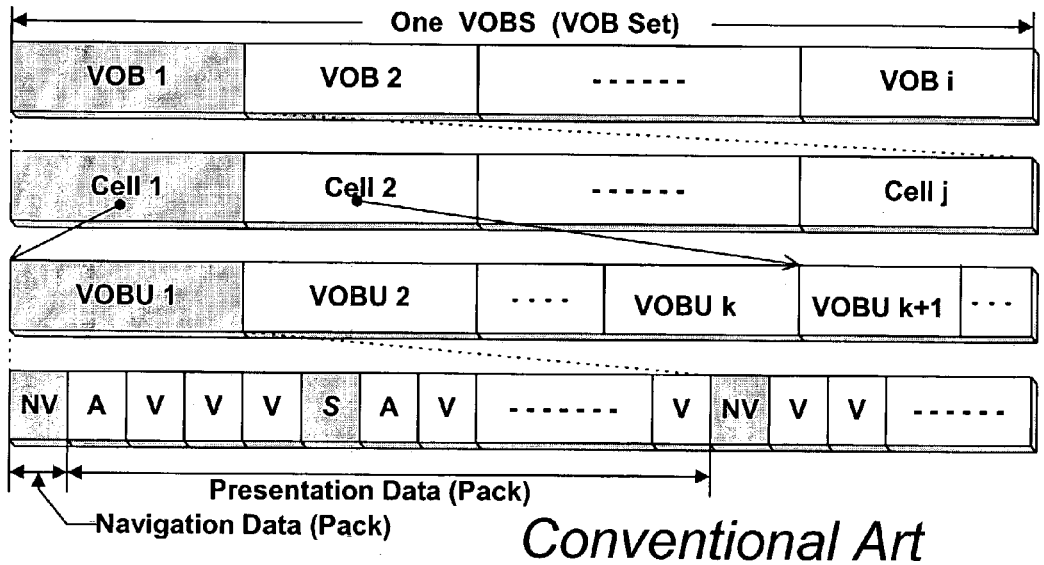

FIG. 5

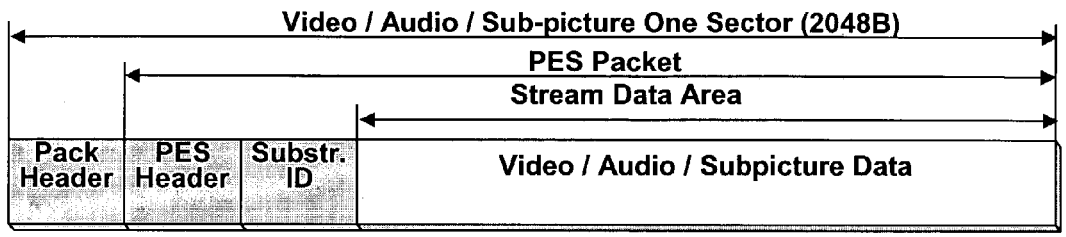

(a)

| Field | Content |
|---|---|
| Pack Header | Start Code (0x000001BA), SCR, Mux Rate |
| PES Header | Start Code (0x000001E0 for Video, 0x000001C0 for MPEG Audio, 0x000001BD for Sub-picture/ AC3 / PCM) |
| Substr. ID | if sub-picture ; 0x20 ~ 0x3F for Language<br>if AC-3 ; 0x80 ~ 0x87 for Language<br>if PCM ; 0xA0 ~ 0xA7 for Language |
| : | : |

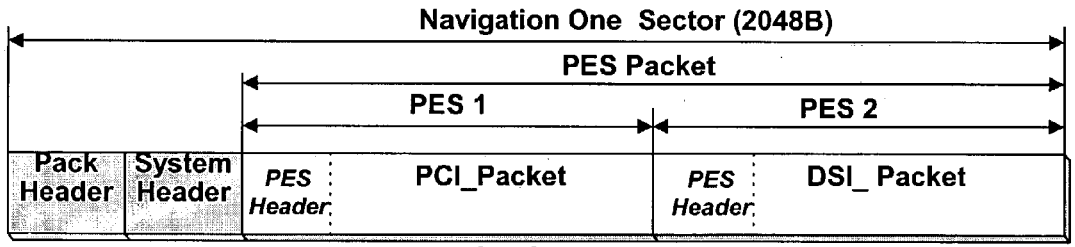

(a)

| Field | Content |
|---|---|
| System Header | System Information |
| PCI_Packet | Presentation Control Information<br>Packet Header<br>Stream id = 0x000001BF, Substream id = *0x00* |
| DSI_Packet | Data Search Information<br>Packet Header<br>Stream id = 0x000001BF, Substream id = *0x01* |
| : | : |

| Information | Location / File | Information |
|---|---|---|
| VMGI (Video Manager Information) | VIDEO_TS.IFO | General<br>  Region, Number of VTS, Video/Audio/Substructure of VMGM Object<br>  (Video : MPEG-1/2, NTSC/PAL, 4:3/16:9, Panscan/LetterBox, Resolution)<br>  (Audio : Number, AC3/PCM/MPEG-1/MPEG-2, Number of Bit, Sampling<br>  Frequency, Number of Channel), (Subpicture : Number od Subpicture)<br>VTS<br>  Number of VTS / Angle / PTT, Parental Level, Start Address, etc.<br>The others<br>  all of Cell start address / VOBU start address, PGCI information |
| VTSI (Video Title Set Information) | VTS_0X_0.IFO | Video/Audio/Substructure of VMGM Object<br>  (Video : MPEG-1/2, NTSC/PAL, 4:3/16:9, Panscan/LetterBox, Resolution)<br>  (Audio : Number, AC3/PCM/MPEG-1/MPEG-2, Number of Bit, Sampling<br>  Frequency, Number of Channel), (Subpicture : Number od Subpicture)<br>End address ( from VTS start address )<br>Video/Audio/Substructure of VTS Object<br>  ( Audio : each informatiom for 8 audio streams )<br>  ( Subpicture : each information for 32 subpicture streams )<br>Entry piont for PTT ( to remark by PGCN/PGN )<br>Time Map (Time : Address )<br>all of Cell / VOBU start/end address of VTSM Object<br>all of Cell / VOBU start/end address of VTS Object |

*Conventional Art*

FIG. 8

| Information | Location / File | Information |
|---|---|---|
| PGCI (Program Chain Information) | VMGI / VTSI | Number of PGM(0~99), Number of Cell(0~255), Play time, NTSC/PAL<br>Substream ID and existence for 8 audio streams<br>Substream ID and existence for 32 subpicture streams<br>PGC number of next/previous current PGC<br>Subpicture palette, Command table<br>Enty piont of Cell for program #n<br>Cell playback information(play time, start address) for each Cell |
| PCI (Presentation Control Information) | NV_PACK of VOBS | LBN of this VOBU relative to first LB of VOBS<br>Presentation start/end time<br>Cell elapse time<br>Angle information<br>Highlight information(Presentation time for HLI, BTN SELECT,BTN ACTIVATE)<br>Number of Button<br>Button color information<br>Button position |
| DSI (Data Search Information) | NV_PACK of VOBS | SCR, LBN<br>End of VOBU<br>End of 1st/2nd/3rd picture<br>VOBU search information for + - 1 ~ 15, 20, 60, 120, 240 |

*Conventional Art*

FIG. 12a

| VTS Table | | | |
|---|---|---|---|
| VTS Number | Start Address | End Address | Pointer |
| VTS 1 | Start Address | End Address | Pointer k-1 |
| VTS 2 | Start Address | End Address | Pointer k |
| : | : | : | : |

(Pointer k)

| PTT Table ( / VTS 2 ) | | | | | |
|---|---|---|---|---|---|
| PTT Number | Start Ad. | End Ad. | # of Sub-Pic. | Pointer | Pointer |
| PTT 1 | Start Ad. | End Ad. | # of Sub-Pic. | Pointer m-1 | Pointer n-1 |
| PTT 2 | Start Ad. | End Ad. | # of Sub-Pic. | Pointer m | Pointer n |
| : | : | : | : | : | : |

(Pointer m)

| Subpicture Table | | |
|---|---|---|
| Sub-picture Number | Stream ID | Language Code |
| Sub-picture #1 | 0 x 20 | English |
| Sub-picture #2 | 0 x 21 | Korea |
| : | : | : |

(Pointer n)

| Subpicture Search Table | | | | | | |
|---|---|---|---|---|---|---|
| Serial No. | Location (LBN) | Language (Text 1) | ------ | Language (Text j) | Start Time | End Time |
| i | Location #1 | Text 1 | ------ | Text j-1 | Ts1 | Te1 |
| i+1 | Location #2 | Text 1 | ------ | Text j | Ts2 | Te2 |
| : | : | : | ------ | : | : | : |

FIG. 12b

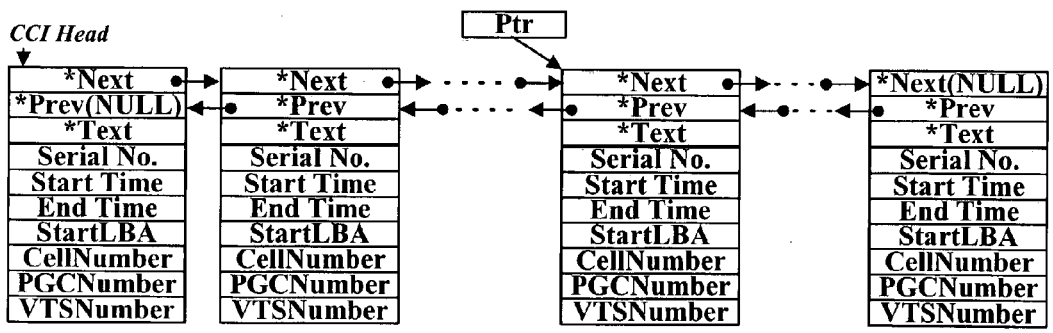

CCIHead : Pointer to first subpicture information
*Next : Pointer to next Subpicture information
*Prev : Pointer to previous Subpicture information
*Text : a pointer to a text string converted from a bitmap image by a character recognition algorithm
Serial No. : Serial number of subpicture Information entry
StartTime : Subpicture Start time in msec
EndTime : Subpicture End time in msec
StartLBA : Start location of a VOBU containing this subpicture
         (relative location from a start position of VTSTT_VOBS)
CellNumber : Cell number containing this subpicture
PGCNumber : PGC number containing playback control information of this subpicture
VTSNumber : VTS number containing this subpicture

METHOD FOR CREATING CAPTION-BASED SEARCH INFORMATION OF MOVING PICTURE DATA, SEARCHING AND REPEATING PLAYBACK OF MOVING PICTURE DATA BASED ON SAID SEARCH INFORMATION, AND REPRODUCTION APPARATUS USING SAID METHOD

BACKGROUND OF THE INVENTION

1. Field of the Invention

The present invention relates to a method of creating caption-based search information for moving picture stream of video title recorded on a disk storage medium and performing search of moving picture stream by using the caption-based search information and conducting caption-based playback repeat in a video disk reproduction apparatus like a DVD player, and a reproduction apparatus using said method.

2. Description of the Related Art

Video reproduction systems with a caption display function like video cassette recorder (VCR) are, in most cases, used to offer an effective means for studying foreign languages. For caption data in a VCR, video signals including character signals for caption are recorded on a video tape, and while the tape is reproduced, the character signals are added to an image signal in the video signal selectively so that the caption can be displayed in a superposed relationship to an image.

Meanwhile, several information storage media such as digital versatile disk (DVD) and DVD-ROM have been recently released in the market for use as the multimedia optical disks. For example, a DVD-ROM that has a diameter of 120 mm and a storage capacity of around 4.7 GB on one side is suited for storage of several video titles in which multiple sub-picture channels and multiple audio channels are provided.

In DVD, caption data is recorded in the sub-picture channels in the form of bit-mapped image signals. While DVD is reproduced, the sub-picture data is read out and is then added to an image signal so as to display the caption.

While viewing video title in foreign language audio mode, it often happens that a viewer wants to see a particular caption again. At this time, it is necessary for the viewer to manually perform search of the moving picture stream which is reproduced with the caption by using search commands offered by the DVD reproduction apparatus and to resume the reproduction operation. The search is generally made by manually operating backward/forward movement keys or reproduction time search operation. Accordingly, it often takes many steps of pause-and-movement operations to precisely locate the moving picture data which is linked to the caption that the viewer wants to see, resulting in slow search time and the viewer's inconvenience.

SUMMARY OF THE INVENTION

It is a primary object of the present invention to provide method and apparatus of creating caption-based video search information, in which each of caption information is linked to the location of its associated moving picture stream which is reproduced concurrently with the caption information, in a moving picture data storage medium like a DVD.

It is another object of the present invention to provide method and apparatus for repeating playback of a video section containing a chosen caption with reference to the caption-based video search information.

To achieve the object, the present invention provides a method of creating caption-based search information for moving picture data of a data storage medium and repeating playback of moving picture data, comprising the steps of: searching for caption information on a storage medium where video, audio, and caption data are recorded in interleaved manner; obtaining the location of moving picture data to be concurrently reproduced with each piece of the found caption information; creating and storing a caption search table where each piece of caption information and the obtained location of the corresponding moving picture data are linked; receiving a request of repetitive reproduction from a user during playback of the storage medium; and searching the stored caption search table for a target caption of which displaying time includes the point of repetitive reproduction requested time, and repeating reproduction of a moving picture data interval during which the target caption is displayed together.

Another method of creating caption-based search information from moving picture data of a storage medium and repeating playback of moving picture data in accordance with the present invention comprises the steps of: searching for caption information on a storage medium where video, audio, and caption data are recorded in interleaved manner; obtaining the location of moving picture data to be concurrently reproduced with each piece of the found caption information; creating and storing a caption search table where each piece of caption information and the obtained location of the corresponding moving picture data are linked; displaying a part of caption information which are selected from the stored caption search table; receiving selection of captions that are included in the displayed caption information; and searching for a moving picture data interval with reference to the stored caption search table and repeating reproduction of the moving picture data interval that is determined by a start time of a first caption of the selected captions and an end time of a last caption of the selected captions.

In the method and apparatus according to the present invention, all caption data are extracted while video titles recorded on a DVD are scanned, and they are stored together with location information of moving picture data, each of which is linked to its associated caption data in terms of reproduction time. When the DVD is reproduced, a list of parts of the caption data is displayed on a screen in which a viewer can choose a caption the viewer wishes to listen or see. Upon choosing of a particular caption, the location of a moving picture data section linked with the selected caption is obtained from the link information between caption data and moving picture data. The moving picture data section is then played back repeatedly. As a result, a viewer can listen to the chosen caption or captions repeatedly with viewing of associated video scenes.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings:

FIG. 1 is a schematic diagram showing the sector area of a DVD;

FIG. 2 is a table showing volume structure and data fields;

FIG. 3 is a table showing file structure and data fields;

FIG. 4 is a schematic diagram showing the structure of a video object VOB;

FIG. 5 is a schematic diagram showing the structure of a presentation pack;

FIG. 6 is a schematic diagram showing the structure of a navigation pack;

FIGS. 7 and 8 are tables showing navigation information structure;

FIGS. 12a 12b show tables comprising caption-based moving picture search information according to the present invention;

DETAILED DESCRIPTION OF THE PREFFERRED EMBODIMENTS

Figure 9:
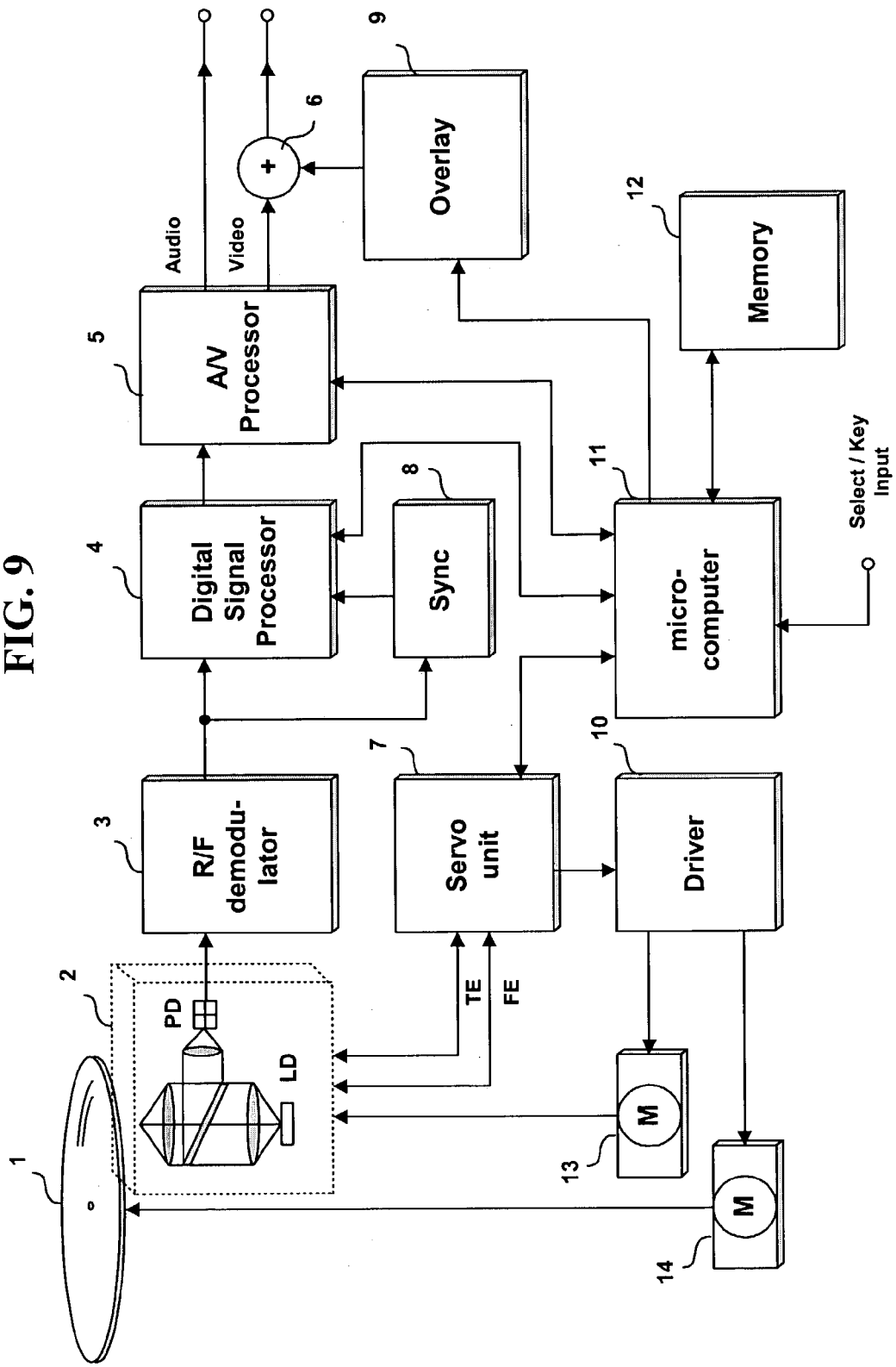
FIG. 9 is a schematic diagram of a reproduction apparatus implementing a method according to the present invention.

The preferred embodiments of the present invention will be described hereinafter in detail referring to the accompanying drawings.

Before describing details of the method and apparatus according to the present invention, the data structure of video titles contained in DVD-ROM, one of multimedia optical disks, is first described briefly below.

As shown in FIG. 1, the volume space of a DVD has the physical sector area (PSA) and the logical sector area (LSA), in which user data is recorded as 2048-byte logical sectors. The start location of the logical sector area, which is located by logical sector number (LSN) #0, is positioned outward away from the start location of the physical sector area by a predetermined distance. That is, the location of the sector of LSN #0 is the same as that of the physical sector number of 0x30000.

The volume space consists of a volume and file structure management area and a file data structure area As shown in FIG. 2, in the volume structure area, a "main volume descriptor sequence" containing a "volume recognition sequence", a "volume ID", a "date and time", and a "logical volume integrity address" and a "reserved volume descriptor sequence" are stored in logic sectors LSN #0 to LSN #256. Information concerning the files stored in the file data structure area which includes a "file set descriptor" containing file names and their start location and size, a "file identifier descriptor", and a "file entry" is stored in logic sectors LBN (logical block number) #0 to LBN #(q-1).

As shown in FIG. 3, the file structure area is made up of a video manager and a plurality of video title sets VTS #1-#K, where K is the number of video title sets. The video manager VMG stores the video manager information VMGI about the entire disk (denoted by VIDEO_TS.IFO) and information needed to build a volume menu which is used to set and change reproduction control of the entire volume (denoted by VIDEO_TS.VOB). Each video title set VTS comprises VTS information denoted by VTS_0k_0.IFO, where k is less than K, a VTS manager object denoted by VTS_0k_0.VOB and a plurality of VTS video objects VOB denoted by VTS_0k_n.VOB (where n=1, 2, . . . ).

The file data structure area stores a plurality of video object sets VOBS, each being made up of video objects VOB arranged in a time series, as shown in FIG. 4. Each VOB is made up of a plurality of cells, each containing playback sequence and playback control information. Each cell has information concerning a sequence of a plurality of video object units (VOBU), arranged in a time series. A VOBU is a multiplexed set of the various kinds of data, each of the multiplexed pieces having a reproduction time between 0.4 and 1.0 seconds. A VOBU comprises navigation data and presentation data which includes video data, audio data, and sub-picture data. Pieces of such data within a VOBU are respectively called video packs, audio packs, and sub-picture packs, each of which is 2048 Bytes in size and is the same size as a logical sector on the DVD. It is possible that no sub-picture data is provided in a VOBU.

The structure of a presentation pack is described with reference to FIG. 5. The presentation packs comprise a "pack header", a "packetized elementary stream (PES) header", a "substream ID" for information on language as sub-picture data, and a "data area" in which audio, video, or sub-picture data are recorded. The pack header includes a "pack start code", a "system clock reference" (SCR) defining the reference time for synchronized audio-visual data playback, and a "multiplex (MUX) rate". The PES header includes "start codes" for audio, video, or sub-picture data. Here, the packetized elementary stream PES indicates a whole data stream exempting the pack header of 14 Bytes, as shown in FIG. 5, and is considered as a data stream of common type.

The data construction of a navigation pack is shown in FIG. 6. The navigation pack comprises a "pack header", a "system header", a "presentation control information (PCI)", and "data search information (DSI)". A navigation pack is placed at the beginning of each of video object units VOBU.

Two types of navigation information are provided in the DVD for playback control. One includes video manger information (VMGI) video title set information (VTSI) where program chain information (PGCI) is contained, as shown in FIGS. 7 and 8. The other navigation information is included in the PCI packet and DSI packet within the navigation packets, as shown in FIG. 6.

Hereinafter, the preferred embodiments of the present invention are described below in detail with reference to the accompanying figures.

FIG. 9 depicts a block diagram of the construction of an optical disk reproduction apparatus to which the method of the present invention is applied, comprising an optical pickup 2 for reading out information recorded in an optical disk by using a light beam irradiated by an LED; an radio-frequency (RF) demodulator 3 for demodulating the signal detected by the optical pickup into binary signal; a digital signal processor 4 for processing the demodulated binary signal to obtain recorded digital data by utilizing a synchronized clock; an audio/video (A/V) signal processor 5 for decompressing audio and video data stream and outputting them to an external device; a servo unit 7 for servo-controlling a driving unit of the optical disk on the basis of focus error signal and tracking error signal; a sled motor 13 for moving the optical pickup in the radial direction of the optical disk under control of the servo unit; a spindle motor 14 for rotating the optical disk under control of the servo unit; a sync clock generator 8 for generating the clock synchronized with the binary signal from the RF demodulator and outputting it to the digital signal processor 4; a microcomputer 11 for controlling the servo unit and the digital signal; a memory 12 for storing control data for the microcomputer and caption data; a display overlay unit 9 for displaying character signals in caption display window in superposed relationship to an image signal; and a mixing unit 6 for adding character signals to the image signal produced by the A/V signal processor 5.

A method of creating caption-based moving picture data search information embodied in the DVD player of FIG. 9 is described below in detail with reference to flowcharts of FIGS. 10 and 11.

Upon loading of a DVD in the DVD player, the microcomputer 11 controls the servo unit 7 so that the DVD rotates at a constant rotation speed. Then, volume structure search mode is set to read data stored in the volume structure area (S10). In the volume structure search mode, the optical pickup 2 is moved to the sector of LSN #256 to read out "main volume descriptor sequence address" which is stored in the "1st anchor point" (S11). By using the address, "main volume descriptor sequence" is read out and "logical volume integrity address" is obtained from a field of the "main volume descriptor sequence".

And then, "logical volume integrity" is read out by using the address and "file set descriptor address" is obtained from a field of the "logical volume integrity" and is then stored (S12, S13). The "file set descriptor" is then read in (S14), and names of all files recorded in the DVD, their sizes and start LSNs are read into the memory 12 (S15). Management information including the number of the video titles, start/end LSN thereof, the number of sub-picture of Part of Title (PTT), and substream ID are also read and stored in the memory 12 (S16).

Upon completion of reading all information required, the DVD player is entered into an operation mode in which a caption-based moving picture data search information, or so-called sub-picture search table shown in FIG. 12 is created based on the data stored in volume structure, file structure, and navigation data (S17).

Figure 11:
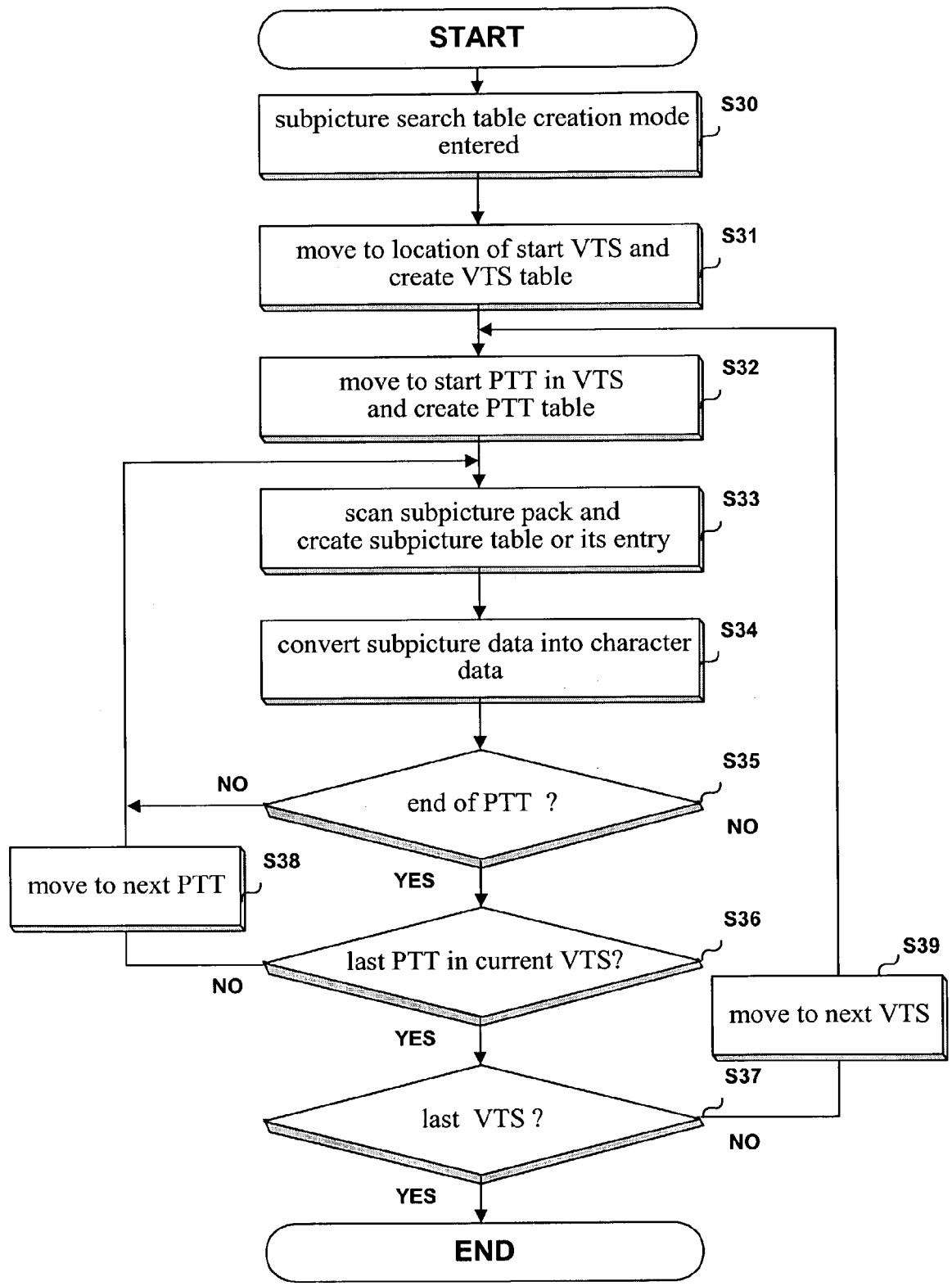

FIG. 11 shows a detailed flowchart of creating the sub-picture search table which is used for caption-based search of moving picture data. In the sub-picture search table creation mode (S30), the number of video title sets VTS, K (the integer value 'K' of the video title set information VTS_0K_0.IFO) is identified. And then, by using the number of the video title sets as well as the start locations and sizes thereof, a "video title set table (VTS table)" is created, as shown in FIG. 12*a* (S31).

The number of PTTs and the start locations and the number of sub-picture data thereof are extracted from the first video title set information VTS_01_0.IFO and are then used to create "PTT table" (S32). Sub-picture data belonging to each PTT are arranged in the tabular form, i.e., a "sub-picture table" is created, as shown in FIG. 12*a*. Then, a "sub-picture search table" is created in which sub-picture data belonging to each PTT is associated with the corresponding moving picture data. Note that if multiple languages are provided in video titles, the "sub-picture table" has multiple rows and "sub-picture search table" has multiple columns for each entry.

Each entry of the "sub-picture search table" has as many columns as the number of sub-picture channels for multiple languages and location information of the moving picture data which are concurrently reproduced with the sub-picture data. In order to create the entries of the "sub-picture search table", while video title set objects (VTS_0X_M.VOB, M=0, 1, 2, . . . ) are scanned, sub-picture data located by identifying the sub-stream ID of packs (the sub-stream of sub-picture data packet ranges from 0×20 to 0×3F) and location information thereof is stored in a row of the "sub-picture search table" (S33). Therefore, each of sub-picture data and location information thereof are indicated by same index value of the "sub-picture search table". Specifically, the location information of each sub-picture data is represented by the logical block number of the start location of the navigation pack belonging to the video object unit VOBU including the sub-picture data. The serial number of each sub-picture entry is also written in the sub-picture search table as shown in FIG. 12*a*.

Furthermore, start and end time of each sub-picture data, that are obtained through analysis of header information of a sub-picture data pack, are written in respective corresponding sub-picture entries.

Instead of creating the hierarchically-structured sub-picture search table starting from a video title set as shown in FIG. 12*a*, a chained sub-picture search table shown in FIG. 12*b* can be created. Each sub-picture entry in the chained sub-picture search table has fields of a pointer '*Text' of sub-picture data, a serial number indicative of order of sub-picture data, start and end time, an index number of a cell containing a concerned sub-picture, an index number of program chain containing reproduction control information of a concerned sub-picture, and an index number of video title set including a concerned sub-picture. All of sub-picture entries are linked each other forward and backward by chain addresses '*Next' and '*Prev'.

Each sub-picture can be stored not in image but in text in a corresponding field of the hierarchical or the chained table. For the text-form storing, sub-picture data which has been stored in a DVD in the form of bit-mapped image data is converted into character data by using character recognition algorithms (S34). General optical character recognition (OCR) methods like artificial neural networks (ANNs)-based method can be applied. In case of ANNs-based character recognition algorithm, a training step is needed to determine the weights of ANNs and to map the output of the ANNs to the corresponding character code. To be specific, a training set of binary bit-mapped images of character samples is prepared and presented repeatedly to self organizing map (SOM), one of ANNs models, the function of which is to classify bit-mapped character samples. A mapping that maps the output of the SOM to one of distinct classes of character codes is then determined and used for a bit-mapped character classifier in a recognition step.

When it is applied, character images are extracted from sub-picture data of bit-mapped image one after another. Each of character images is converted into a black-and-white bit-mapped image and is then applied to the character classifier. In this way, caption images of sub-picture data are converted into character codes and are then stored in the memory and used for display. It is possible to display additional information by using character codes, for example, the meaning of words while the caption is displayed on a screen.

After creation of the "sub-picture table" and the "sub-picture search table" for a PTT is completed, the addresses pointing to the two tables are stored in the corresponding row of the "PTT table", as shown in FIG. 12*a* or 12*b*.

Once the scan of all PTTs in the video title sets VTS is completed through the loop formed by step S35, S36, and S37, the creation operation of the "sub-picture search table" is ended.

Without the character conversion operation, the caption images of sub-picture data can be directly stored as respective entries of the table shown in FIG. 12*a* or 12*b* in the memory 12 and used for display.

Figure 14:
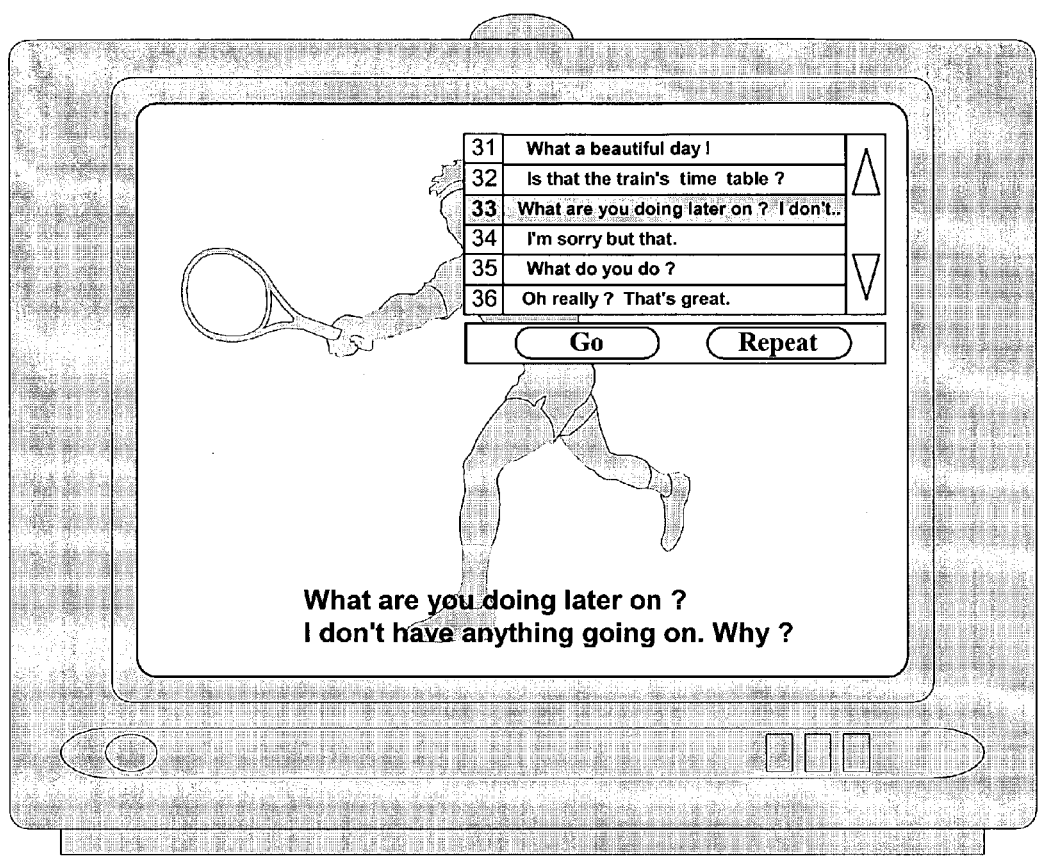
FIG. 14 is a schematic diagram illustrating a caption list display window while reproducing a DVD title.

The three pointers of FIG. 12*a*, P1*x*, P2*x*, and P3*x*, are used to point to the start point or range of captions listed in a caption display window that appear on a screen during playback, as shown in FIG. 14. To be specific, P1*x*, P2*x*, and P3*x* point to one entry of the PTT table, sub-picture table, and sub-picture search table, respectively, and they are updated when the video title is played back by the microcomputer 11.

Figure 13:
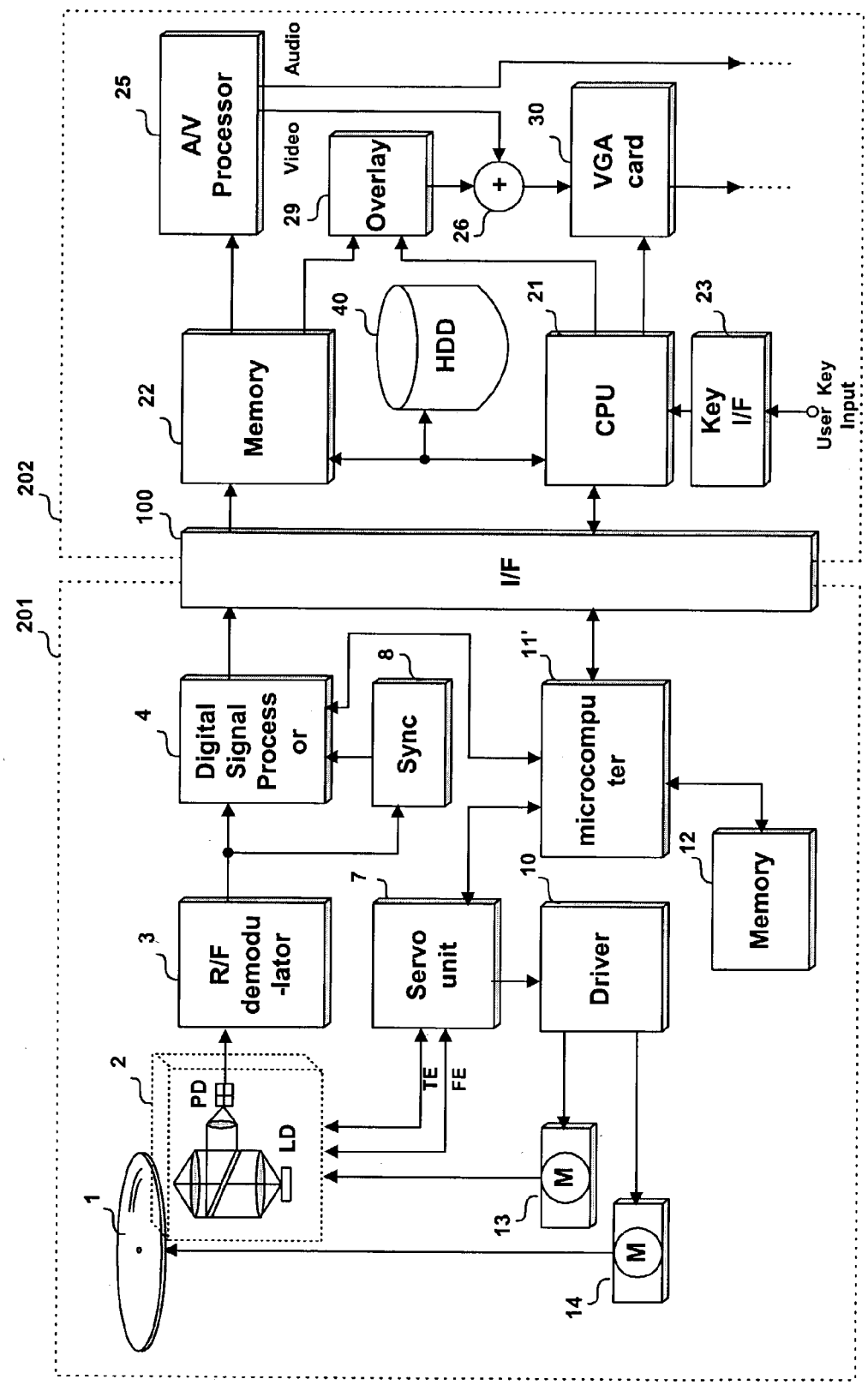
FIG. 13 is a schematic diagram showing another embodiment of reproduction apparatus to implement the method according to the present invention.

FIG. 13 depicts a block diagram of another embodiment of the optical disk reproduction apparatus which is embodied in a personal computer to implement the present method according to the present invention. This embodiment comprises an optical disk driver 201 and a personal computer 202, both of which are connected to each other through a digital interference 100. The optical disk driver part comprises an optical pickup 2 for reading out information recorded in an optical disk; an RF demodulator 3 for demodulating the signal detected by the optical pickup; a digital signal processor 4 for processing the demodulated binary signal to obtain digital data; a servo unit 7 for servo-controlling a driving unit of the optical disk; a sled motor 13 for moving the optical pickup in the radial direction of the optical disk; a spindle motor 14 for rotating the optical disk; a sync clock generator 8 for generating a clock synchronized with the binary signal from the RF demodulator and outputting it to the digital signal processor 4; a microcomputer 11' for controlling the servo unit and the digital signal processor 4, and communicating with an external device; a memory 12 for storing control data for the microcomputer. On the other hand, the personal computer part comprises a memory 22 for storing data transmitted from the optical disk driver through the digital interface 100; an A/V signal processor 25 for decompressing audio and video data stream read out from the memory; a display overlay unit 29 for displaying character signal in a caption display window in superposed relationship to an image signal; a mixing unit 26 for adding character signal of the display overlay unit to the image signal produced by the A/V signal processor 25; a video card 30 for outputting the mixed image signal to an external display unit; a central processing unit (CPU) 21 for controlling the mixing unit as well as above-mentioned components according to commands entered from keyboard 23 or pointing device; and a hard disk 40 for storing software programs.

The reproduction operation in the optical disk reproduction apparatus of FIG. 13 is as follows. The microcomputer 11' receives control commands from an personal computer and controls the digital signal processor 4 and the servo unit 7 according to the commands, so that data stored in the optical disk is reproduced and sent it to the personal computer through the digital interface 100. The data is stored in the memory 22 temporarily and is then inputted to the A/V signal processor 25.

These operations such as control of the optical disk driver 201 and data communication through the digital interface 100 are performed by loading a program stored in the hard disk 40 into the memory 22 and executing the program on the CPU 21.

Figure 10:
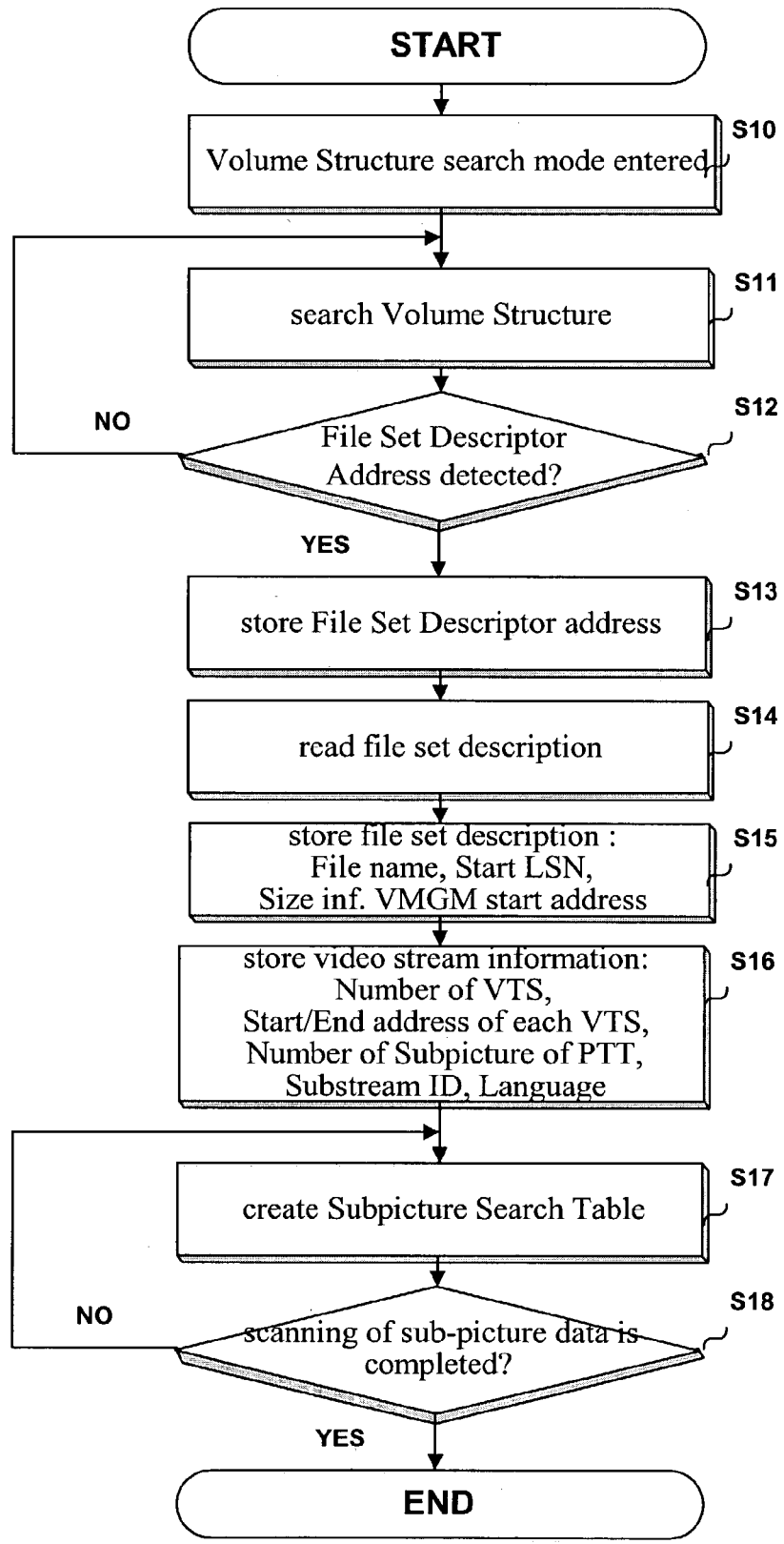
FIGS. 10 and 11 are flowcharts showing a method of creating link information between caption data and moving picture data according to the present invention.

The method of creating caption-based moving picture data search information in the embodiment of FIG. 13 is the same as that of the foregoing embodiment of FIG. 10 except that, after the caption-based moving picture data search information is created, it is stored in the hard disk 40 as a file in order to avoid a redundant creation operation that takes place when the same optical disk is inserted in the optical disk driver. To do this, once an optical disk is loaded, the volume ID on the disk is identified. It is then checked whether or not a file which contains the caption-based moving picture data search information corresponding to the volume ID has been stored on the hard disk 40. If the corresponding file does not exist, a new caption-based moving picture data search information is created and stored in the hard disk 40. Otherwise, the corresponding file is read into the memory and used to perform caption-based search of moving picture data.

Once the caption-based search table for moving picture data such as sub-picture search table of FIG. 12 is created in this way, when a viewer selects a particular caption data, the location of the video object unit VOBU which is linked to the selected caption data is obtained with reference to the corresponding entry of the sub-picture search table.

FIG. 14 illustrates a caption display window according to the present invention, which is displayed at the corner of the main image display window (optionally in full-size window). The caption display window has a scroll bar by which a viewer can choose any caption included in video titles.

Figure 15:
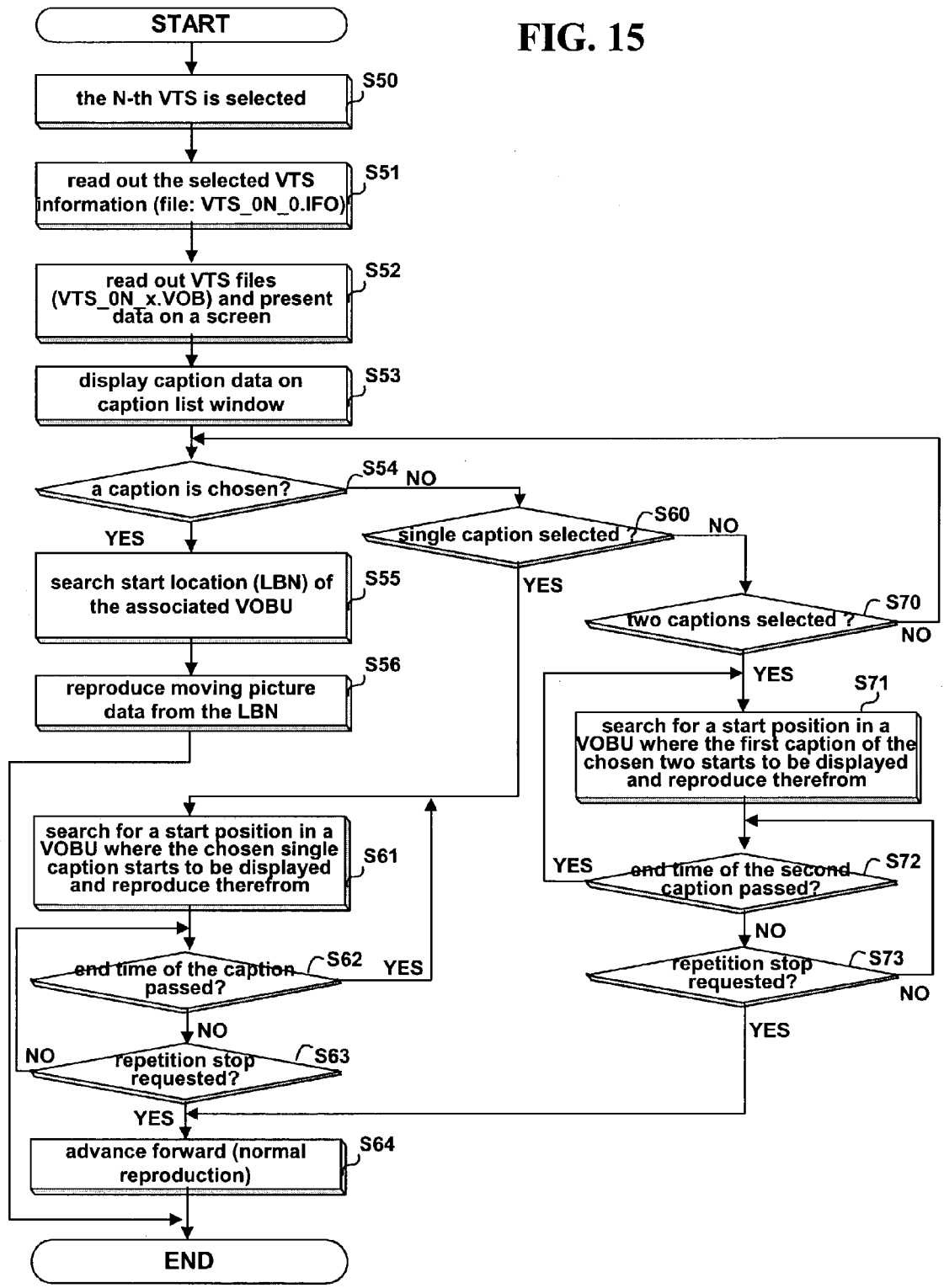
FIG. 15 is a flowchart showing a method of searching for and repeating playback of moving picture data on the basis of the created link information between caption data and moving picture data.

By selecting a particular caption on the caption display window, the viewer can search for any moving picture data linked to the selected caption and resume to reproduce the video title at the located moving picture data. The operations for caption selection on the caption display window and the resulting search and playback repetition of the corresponding moving picture are described below in detail with reference to a flowchart of FIG. 15.

On specifying a video title set, VTS (S50), a file containing video title set information corresponding to the specified VTS, say, VTS_0N0.IFO is read out to obtain the start/end location of the VTS, attributes of video/audio/sub-picture data, and PTT (S51). And then, the video objects VOB belonging to the specified VTS begins to be reproduced (S52). Meanwhile, among the caption data which have been stored as text data in the memory 12 by application of character recognition algorithm, the caption data which are linked to moving picture data falling into a predetermined period of time centering the moving picture data being reproduced are outputted to the display overlay 9, so that they are superimposed on the image data by the mixing unit 6 and displayed on the caption display window (S53). At this time, serial number of each caption (sub-picture) entry is displayed together.

After that, if a viewer chooses a caption among captions listed in the caption display window and enters 'go' command or makes double-clicks on a caption (S54), the related search information, namely, program chain number, cell number, video title set number, and relative logical block number LBN of a corresponding video object unit VOBU are retrieved from the sub-picture search table which was already made (S55), and then the optical pickup is jumped to the location of the corresponding VOBU. At this time, three pointers for PTT table, sub-picture table, and sub-picture search table of FIG. 12$a$, P1$x$, P2$x$, and P3$x$, or the pointer 'Ptr' for the table of FIG. 12$b$ is updated in accordance with the jump.

A PES packet of which PTS (Presentation Time Stamp) is closest to a PTS (start time) of the chosen caption is searched for in a determined VOBU, and then decoded therefrom to be presented (S56). In this way, it is possible to search and display moving picture data which is linked to the selected caption on the caption display window.

Meanwhile, if the captions are scrolled up or down in the caption display window and thus the captions to be listed fall outside of the current PTT table, P1$x$ is changed, that is, P1$x$ points to the next or previous PTT table, and the two pointers of the PTT table point to another sub-picture table and sub-picture search table in accordance with the PTT pointed by the updated P1$x$, respectively. In this way, captions on the caption list window are scrolled and displayed smoothly.

If a 'repeat' command is entered after a single or two caption strings (start and end caption string) are selected, a video interval to be presented concurrently with the chosen caption string or strings is repeatedly reproduced as follows.

In case that a 'repeat' command is entered after selection of a single caption string (S60), same as explained above, a start position is searched for in a VOBU containing the chosen caption string and reproduction is started therefrom (S61). During the reproduction, it is checked whether end time of the caption string displaying duration is passed (S62). If passed, reproduction point is returned to the start position and reproduction is resumed therefrom (S61). This repetitive reproduction continues until repetition stop is requested from a viewer (S63). If repetition stop is entered, reproduction point advances forward (S64) without jump back.

In case that a 'repeat' command is entered after selection of two caption strings (S70), a video position from which the former caption string of the two is displayed is searched for and reproduction is started therefrom, same as explained above (S71). After the latter caption string of the two starts to be displayed along with video data, it is checked whether end time of the latter caption string displaying duration is passed (S72). If passed, reproduction is jumped back and resumed from the start position from which the former caption string is displayed. This repetitive reproduction continues until repetition stop is requested from a viewer (S73). If repetition stop is entered, reproduction point advances forward (S74) without jump back.

Instead of selecting a caption string for playback repetition, a serial number of a caption string that is displayed in the caption display window may be selected. That is, if a serial number (or numbers) is entered from a viewer, a sub-picture entry (or entries) identified by the entered serial number (or numbers) is searched for in the sub-picture search table. If found, the caption-based video interval playback repetition is conducted as explained before.

Another caption-based video interval repeatedly-playing method is conducted as follows.

When repetitive playback is requested, the relative time of the point of repetitive playback requested time from playing start time is calculated first. Then, a sub-picture entry of which start and end time are respectively before and after the calculated relative time is searched for in the sub-picture search table of FIG. 12a or 12b.

If the target entry is found, a video position from which a caption string of the target sub-picture entry is displayed is searched for with reference to information in the target entry and reproduction is resumed therefrom. The moment reproduction time passes the end time of the sub-picture entry, reproduction point is returned to the video position where the target caption string is displayed and advances forward. This caption-based repetitive playing operation would be conducted without viewer's interruption.

If a viewer chooses, during the caption-based repetitive playback, another caption string before or after the playback-repeated caption string from the displayed caption list window or by entering the serial number of said another caption string, a sub-picture entry of the newly chosen caption string is identified and then searched for in the sub-picture search table of FIG. 12a or 12b. If found, a video interval where the chosen caption string is displayed with video pictures are repeatedly played back.

The present invention explained above provides a rapid, exact, and automatic way of searching for moving picture data which is reproduced concurrently with a caption chosen by a viewer and further provides simple caption-based video interval repeatedly-playing way, so that it is very useful for a person to practice listening and speaking foreign language study while viewing the title recorded on a disk.

The foregoing is provided only for the purpose of illustration and explanation of the preferred embodiments of the present invention, so changes, variations and modifications may be made without departing from the spirit and scope of the invention.

What is claimed is:

1. A method of creating caption-based search information from moving picture data of a storage medium and repeating playback of moving picture data, comprising the steps of:
   (a) searching for caption information on a storage medium where video, audio, and caption data are recorded in interleaved manner;
   (b) obtaining the location of moving picture data to be concurrently reproduced with each piece of the caption information found in said step (a);
   (c) creating and storing a caption search table where each piece of caption information and the obtained location of the corresponding moving picture data are linked;
   (d) receiving a request of repetitive reproduction from a user during playback of the storage medium; and
   (e) searching the stored caption search table for a target caption of which displaying time includes the point of repetitive reproduction requested time, and repeating reproduction of a moving picture data interval during which the target caption is displayed together.

2. The method of claim 1, wherein said step (c) further writes respective serial numbers of the pieces of caption information in the caption search table.

3. The method of claim 2, further comprising the step of searching the stored caption search table for another caption of which serial number is entered from a user during repetitive reproduction of the moving picture data interval, and repeating to reproduce another moving picture data interval during which said another caption is displayed together.

4. The method of claim 1, wherein said step (c) comprises the steps of:
   converting bit-mapped data of each piece of the caption information into text data consisting of characters; and
   storing each pair of the text data and the location of the moving picture data in a table structure, the text data and the location of the corresponding moving picture data in a pair having same index values in the table structure.

5. The method of claim 1, further comprising the steps of:
   (f) receiving a movement request to another caption before or after the repeatedly-played caption from a user during repetitive reproduction of the moving picture data interval; and
   (g) searching the stored caption search table for said another caption, and repeating to reproduce another moving picture data interval during which said another caption is displayed together.

6. A method of creating caption-based search information from moving picture data of a storage medium and repeating playback of moving picture data, comprising the steps of:
   (a) searching for caption information on a storage medium where video, audio, and caption data are recorded in interleaved manner;
   (b) obtaining the location of moving picture data to be concurrently reproduced with each piece of the caption information found in said step (a);
   (c) creating and storing a caption search table where each piece of caption information and the obtained location of the corresponding moving picture data are linked;
   (d) displaying some pieces of caption information which are selected from the stored caption search table;
   (e) receiving selection of captions that are included in the displayed caption information; and
   (f) searching for a moving picture data interval with reference to the stored caption search table and repeating to reproduce the moving picture data interval that is determined by a start time of a first caption of the selected captions and an end time of a last caption of the selected captions.

7. A method of creating caption-based search information from moving picture data of a storage medium and repeating playback of moving picture data, comprising the steps of:
  (a) searching for caption information on a storage medium where video, audio, and caption data are recorded in interleaved manner;
  (b) obtaining the location of moving picture data to be concurrently reproduced with each piece of the caption information found in said step (a);
  (c) creating and storing a caption search table where each piece of caption information, serial number thereof and the obtained location of the corresponding moving picture data are linked;
  (d) receiving a start and an end serial number of caption during playback of the storage medium; and
  (f) searching for a moving picture data interval with reference to the stored caption search table and repeating to reproduce the moving picture data interval that is determined by a start time of a first caption identified by the start serial number and an end time of a second caption identified by the end serial number.

8. An apparatus for reproducing a storage medium containing moving picture data, comprising:
  means for driving the storage medium;
  a first controlling means for searching the driven storage medium for caption information and creating a caption search table where each piece of caption information and a location of moving picture data to be concurrently reproduced with each piece are linked;
  means for storing the created caption search table;
  means for receiving a caption selection from a user and displaying a part of caption information selected from the caption search table; and
  a second controlling means for identifying which caption information is chosen by a viewer and controlling the driving means with reference to the stored caption search table to repeat reproduction of a moving picture data interval during which the identified caption information is displayed together.

* * * * *